(12) United States Patent
Takenaka et al.

(10) Patent No.: US 11,280,919 B2
(45) Date of Patent: Mar. 22, 2022

(54) RADIATION IMAGING APPARATUS AND RADIATION IMAGING SYSTEM

(71) Applicant: CANON KABUSHIKI KAISHA, Tokyo (JP)

(72) Inventors: Katsuro Takenaka, Honjo (JP); Shoshiro Saruta, Tokyo (JP); Atsushi Iwashita, Tokyo (JP); Kentaro Fujiyoshi, Tokyo (JP); Keiichi Nomura, Kawasaki (JP); Kazumi Nagano, Tokyo (JP); Yohei Ishida, Kawasaki (JP); Tomoki Komatsu, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/720,989

(22) Filed: Dec. 19, 2019

(65) Prior Publication Data
US 2020/0124749 A1 Apr. 23, 2020

Related U.S. Application Data

(63) Continuation of application No. PCT/JP2018/020996, filed on May 31, 2018.

(30) Foreign Application Priority Data

Jul. 10, 2017 (JP) .............................. JP2017-134956
Oct. 13, 2017 (JP) .............................. JP2017-199603

(51) Int. Cl.
*G01T 1/20* (2006.01)

(52) U.S. Cl.
CPC ................................. *G01T 1/2018* (2013.01)

(58) Field of Classification Search
CPC ........... G01T 1/20; G01T 1/2018; G01T 1/24; G01T 1/00; G01T 1/202; G01T 1/2006; G01N 23/04
See application file for complete search history.

(56) References Cited

U.S. PATENT DOCUMENTS

| 7,227,926 B2 | 6/2007 | Kameshima et al. |
| 7,256,404 B2 | 8/2007 | Inoue et al. |

(Continued)

FOREIGN PATENT DOCUMENTS

| JP | 2010-056396 | 3/2010 |
| JP | 2012-026932 | 2/2012 |

(Continued)

*Primary Examiner* — David P Porta
*Assistant Examiner* — Mamadou Faye
(74) *Attorney, Agent, or Firm* — Venable LLP

(57) ABSTRACT

A radiation imaging apparatus is provided. The apparatus includes a substrate in which conversion elements are arranged and which transmits light beams, a first scintillator arranged on a first surface side of the substrate, and a second scintillator arranged on a second surface side opposite to the first surface. The conversion elements include first conversion elements and second conversion elements. The first conversion elements are arranged so as to receive light beams from the first scintillator and the second scintillator. A light-shielding layer is arranged between the first scintillator and each of the second conversion elements so as to set light amounts of the second conversion elements from the first scintillator smaller than those of the first conversion elements from the first scintillator, and the second conversion elements are arranged to receive a light beam from the second scintillator.

17 Claims, 11 Drawing Sheets

(56) References Cited

U.S. PATENT DOCUMENTS

| | | |
|---|---|---|
| 7,342,221 B2 | 3/2008 | Takenaka et al. |
| 7,343,000 B2 | 3/2008 | Kameshima et al. |
| 7,381,963 B2 | 6/2008 | Endo et al. |
| 7,386,089 B2 | 6/2008 | Endo et al. |
| 7,391,029 B2 | 6/2008 | Takeda et al. |
| 7,403,594 B2 | 7/2008 | Endo et al. |
| 7,435,968 B2 | 10/2008 | Watanabe et al. |
| 7,442,939 B2 | 10/2008 | Yagi et al. |
| 7,465,933 B2 | 12/2008 | Ishii et al. |
| 7,466,345 B2 | 12/2008 | Kameshima et al. |
| 7,476,027 B2 | 1/2009 | Takenaka et al. |
| 7,488,948 B2 | 2/2009 | Ishii et al. |
| 7,514,663 B2 | 4/2009 | Yagi et al. |
| 7,514,686 B2 | 4/2009 | Ogawa et al. |
| 7,514,690 B2 | 4/2009 | Endo et al. |
| 7,532,706 B2 | 5/2009 | Kameshima et al. |
| 7,535,506 B2 | 5/2009 | Nomura et al. |
| 7,538,330 B2 | 5/2009 | Nomura et al. |
| 7,541,591 B2 | 6/2009 | Endo et al. |
| 7,541,617 B2 | 6/2009 | Mochizuki et al. |
| 7,557,355 B2 | 7/2009 | Mochizuki et al. |
| 7,573,038 B2 | 8/2009 | Yokoyama et al. |
| 7,573,041 B2 | 8/2009 | Kameshima et al. |
| 7,595,493 B2 | 9/2009 | Okada et al. |
| 7,613,277 B2 | 11/2009 | Takenaka et al. |
| 7,629,564 B2 | 12/2009 | Mochizuki et al. |
| 7,629,587 B2 | 12/2009 | Yagi et al. |
| 7,645,995 B2 | 1/2010 | Yagi et al. |
| 7,683,337 B2 | 3/2010 | Takenaka et al. |
| 7,696,484 B2 | 4/2010 | Yokoyama et al. |
| 7,714,294 B2 | 5/2010 | Sawada et al. |
| 7,718,973 B2 | 5/2010 | Endo et al. |
| 7,723,693 B2 | 5/2010 | Okada et al. |
| 7,724,874 B2 | 5/2010 | Kameshima et al. |
| 7,732,776 B2 | 6/2010 | Takenaka et al. |
| 7,732,778 B2 | 6/2010 | Yokoyama et al. |
| 7,750,309 B2 | 7/2010 | Endo et al. |
| 7,750,422 B2 | 7/2010 | Watanabe et al. |
| 7,791,034 B2 | 9/2010 | Kameshima et al. |
| 7,791,035 B2 | 9/2010 | Yokoyama et al. |
| 7,812,317 B2 | 10/2010 | Watanabe et al. |
| 7,847,263 B2 | 12/2010 | Yagi et al. |
| 7,850,367 B2 | 12/2010 | Takenaka et al. |
| 7,858,947 B2 | 12/2010 | Mochizuki et al. |
| 7,869,568 B2 | 1/2011 | Yokoyama et al. |
| 7,872,218 B2 | 1/2011 | Endo et al. |
| 7,880,145 B2 | 2/2011 | Yagi et al. |
| 7,893,405 B2 | 2/2011 | Nagano et al. |
| 7,923,695 B2 | 4/2011 | Ishii et al. |
| 7,952,058 B2 | 5/2011 | Nomura et al. |
| 7,989,772 B2 | 8/2011 | Yagi et al. |
| 8,072,514 B2 | 12/2011 | Takenaka et al. |
| 8,093,562 B2 | 1/2012 | Yokoyama et al. |
| 8,107,588 B2 | 1/2012 | Kameshima et al. |
| 8,115,177 B2 | 2/2012 | Takeda et al. |
| 8,154,641 B2 | 4/2012 | Nomura et al. |
| 8,167,486 B2 | 5/2012 | Takenaka et al. |
| 8,222,611 B2 | 7/2012 | Yagi et al. |
| 8,304,735 B2 | 11/2012 | Inoue et al. |
| 8,431,902 B2 | 4/2013 | Nakatsugawa et al. |
| 8,576,294 B2 | 11/2013 | Kameshima et al. |
| 8,648,312 B2 | 2/2014 | Ichimura et al. |
| 8,653,465 B2 | 2/2014 | Nagano et al. |
| 8,704,185 B2 | 4/2014 | Ishida et al. |
| 8,723,996 B2 | 5/2014 | Yokoyama et al. |
| 8,792,024 B2 | 7/2014 | Takenaka et al. |
| 8,809,795 B2 | 8/2014 | Takenaka et al. |
| 8,829,438 B2 | 9/2014 | Sato et al. |
| 8,878,972 B2 | 11/2014 | Wayama et al. |
| 8,957,383 B2 | 2/2015 | Sasaki et al. |
| 9,006,665 B2 | 4/2015 | Nagano et al. |
| 9,048,154 B2 | 6/2015 | Takenaka et al. |
| 9,052,400 B2 | 6/2015 | Saruta et al. |
| 9,054,012 B2 | 6/2015 | Nomura et al. |
| 9,128,196 B2 | 9/2015 | Sato et al. |
| 9,134,432 B2 | 9/2015 | Iwashita et al. |
| 9,234,271 B2 | 1/2016 | Nomura et al. |
| 9,234,966 B2 | 1/2016 | Sugawara et al. |
| 9,270,903 B2 | 2/2016 | Wayama et al. |
| 9,277,896 B2 | 3/2016 | Ofuji et al. |
| 9,377,541 B2 | 6/2016 | Hasegawa et al. |
| 9,423,512 B2 | 8/2016 | Sato et al. |
| 9,423,513 B2 | 8/2016 | Watanabe et al. |
| 9,445,030 B2 | 9/2016 | Yagi et al. |
| 9,462,989 B2 | 10/2016 | Takenaka et al. |
| 9,468,414 B2 | 10/2016 | Ryu et al. |
| 9,470,800 B2 | 10/2016 | Iwashita et al. |
| 9,470,802 B2 | 10/2016 | Okada et al. |
| 9,521,347 B2 | 12/2016 | Kawanabe et al. |
| 9,541,653 B2 | 1/2017 | Iwashita et al. |
| 9,568,614 B2 | 2/2017 | Ishida et al. |
| 9,625,585 B1 | 4/2017 | Yokoyama et al. |
| 9,655,586 B2 | 5/2017 | Yagi et al. |
| 9,661,240 B2 | 5/2017 | Fujiyoshi et al. |
| 9,675,307 B2 | 6/2017 | Ofuji et al. |
| 9,726,767 B2 | 8/2017 | Kawanabe et al. |
| 9,737,271 B2 | 8/2017 | Iwashita et al. |
| 9,812,474 B2 | 11/2017 | Yagi et al. |
| 9,835,732 B2 | 12/2017 | Fujiyoshi et al. |
| 9,838,638 B2 | 12/2017 | Furumoto et al. |
| 9,948,871 B2 | 4/2018 | Wayama et al. |
| 9,971,043 B2 | 5/2018 | Ishida |
| 9,971,046 B2 | 5/2018 | Ryu et al. |
| 9,977,135 B2 | 5/2018 | Yokoyama et al. |
| 9,980,685 B2 | 5/2018 | Iwashita et al. |
| 9,989,656 B2 | 6/2018 | Sato et al. |
| 10,009,990 B2 | 6/2018 | Takenaka et al. |
| 10,068,943 B2 | 9/2018 | Fujiyoshi et al. |
| 10,197,684 B2 | 2/2019 | Terui et al. |
| 10,274,612 B2 | 4/2019 | Ishii et al. |
| 10,283,555 B2 | 5/2019 | Ichimura et al. |
| 10,349,914 B2 | 7/2019 | Takenaka et al. |
| 10,416,323 B2 | 9/2019 | Ryu et al. |
| 10,441,238 B2 | 10/2019 | Terui et al. |
| 10,448,908 B2 | 10/2019 | Sasaki et al. |
| 10,473,801 B2 | 11/2019 | Kawanabe et al. |
| 10,537,295 B2 | 1/2020 | Watanabe et al. |
| 2008/0011960 A1 | 1/2008 | Yorkston et al. |
| 2008/0245968 A1* | 10/2008 | Tredwell ........... H01L 27/14632 250/370.09 |
| 2010/0054418 A1* | 3/2010 | Okada ................... G01T 1/2018 378/114 |
| 2010/0148080 A1 | 6/2010 | Endo et al. |
| 2011/0303849 A1* | 12/2011 | Tredwell ............... G01T 1/2018 250/362 |
| 2011/0317054 A1 | 12/2011 | Kameshima et al. |
| 2012/0106698 A1 | 5/2012 | Karim et al. |
| 2012/0205543 A1 | 8/2012 | Nakatsugawa et al. |
| 2012/0219115 A1 | 8/2012 | Okada et al. |
| 2013/0119260 A1 | 5/2013 | Nakatsugawa et al. |
| 2013/0126743 A1 | 5/2013 | Iwakiri et al. |
| 2013/0153775 A1 | 6/2013 | Nomura et al. |
| 2013/0168559 A1 | 7/2013 | Saruta et al. |
| 2013/0308755 A1 | 11/2013 | Ishida et al. |
| 2013/0342514 A1 | 12/2013 | Yokoyama et al. |
| 2014/0034836 A1 | 2/2014 | Takei et al. |
| 2014/0091225 A1 | 4/2014 | Sasaki et al. |
| 2014/0154833 A1 | 6/2014 | Wayama et al. |
| 2014/0239186 A1 | 8/2014 | Sato et al. |
| 2014/0284485 A1 | 9/2014 | Nagano et al. |
| 2014/0361189 A1 | 12/2014 | Kameshima et al. |
| 2016/0172414 A1 | 6/2016 | Saruta et al. |
| 2016/0270755 A1 | 9/2016 | Takenaka et al. |
| 2018/0128755 A1 | 5/2018 | Iwashita et al. |
| 2018/0317868 A1 | 11/2018 | Terui et al. |
| 2018/0328862 A1 | 11/2018 | Sato et al. |
| 2019/0029618 A1 | 1/2019 | Sato et al. |
| 2019/0146103 A1 | 5/2019 | Ofuji et al. |
| 2019/0179036 A1 | 6/2019 | Takenaka et al. |
| 2019/0313525 A1 | 10/2019 | Nagano et al. |
| 2019/0320993 A1 | 10/2019 | Noda et al. |
| 2019/0343468 A1 | 11/2019 | Nomura et al. |
| 2019/0349541 A1 | 11/2019 | Iwashita et al. |
| 2019/0391629 A1 | 12/2019 | Yokoyama et al. |

(56) References Cited

U.S. PATENT DOCUMENTS

| | | |
|---|---|---|
| 2020/0008766 A1 | 1/2020 | Watanabe et al. |
| 2020/0041664 A1 | 2/2020 | Furumoto et al. |
| 2020/0060639 A1 | 2/2020 | Sato et al. |

FOREIGN PATENT DOCUMENTS

| | | |
|---|---|---|
| JP | 2012-168010 | 9/2012 |
| JP | 2016-090388 | 5/2016 |
| WO | 2011/152322 | 12/2011 |
| WO | 2011/152419 | 12/2011 |

\* cited by examiner 901  902

901  902

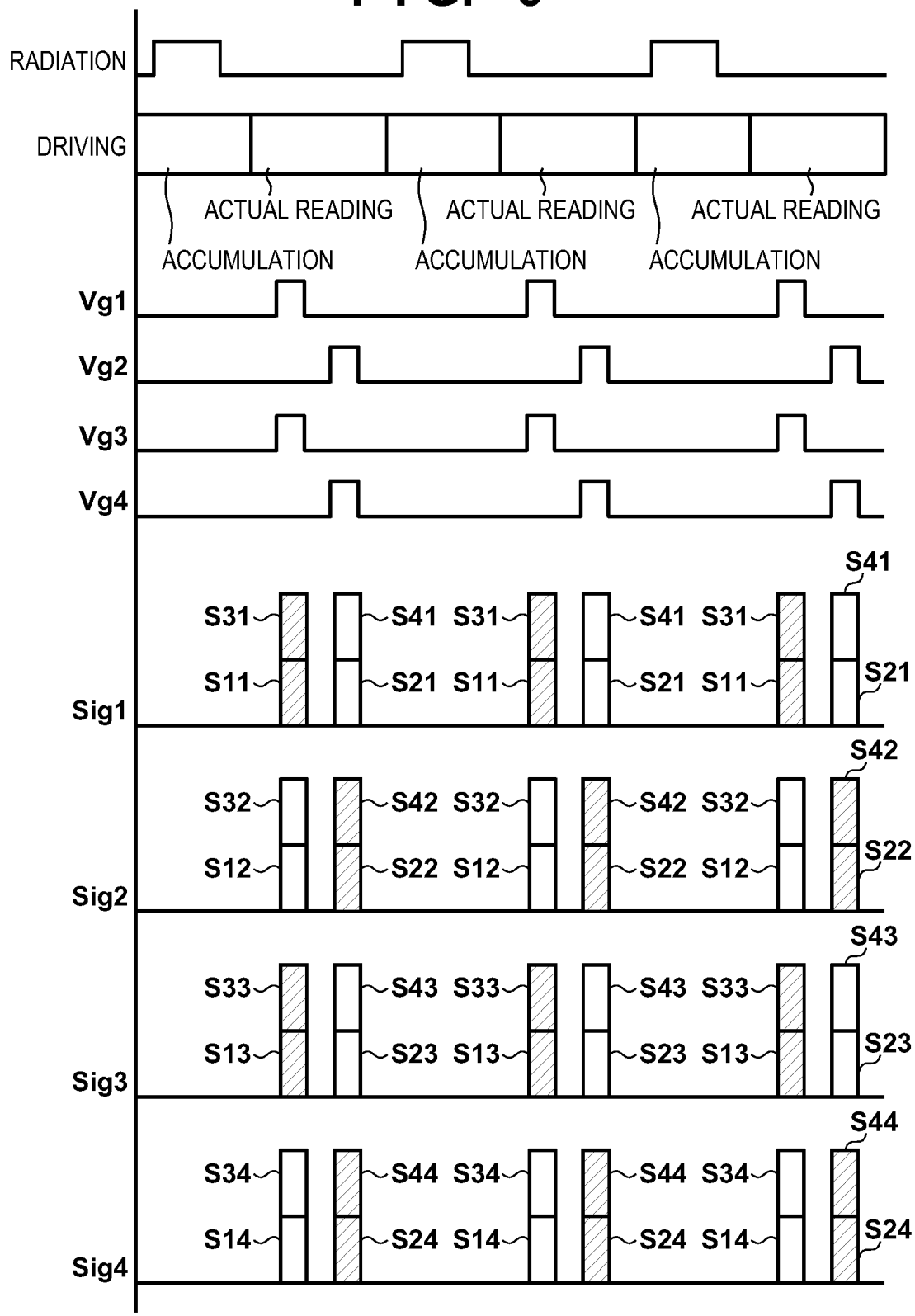

RADIATION IMAGING APPARATUS AND RADIATION IMAGING SYSTEM

CROSS-REFERENCE TO RELATED APPLICATIONS

This application is a Continuation of International Patent Application No. PCT/JP2018/020996, filed May 31, 2018, which claims the benefit of Japanese Patent Application No. 2017-134956, filed Jul. 10, 2017, and Japanese Patent Application No. 2017-199603, filed Oct. 13, 2017, both of which are hereby incorporated by reference herein in their entirety.

BACKGROUND OF THE INVENTION

Field of the Invention

The present invention relates to a radiation imaging apparatus and a radiation imaging system.

Background Art

As an imaging apparatus used for medical imaging diagnosis and non-destructive inspection, a radiation imaging apparatus including an imaging panel in which pixels each including a combination of a conversion element for converting radiation into charges and a switching element such as a thin-film transistor (TFT) are arranged in an array has been very popular. There is known a method of acquiring an energy subtraction image such that a plurality of radiation images are acquired using radiations having different energy components using such a radiation imaging apparatus and a specific object portion is separated or enhanced from a difference between the acquired radiation images. PTL 1 discloses an arrangement in which scintillators are respectively arranged on the two surfaces of a light-transmitting substrate, and a photodiode for detecting a light beam emitted from one scintillator and a photodiode for detecting a light beam emitted from the other scintillator are arranged. The photodiodes for detecting the light beams emitted from the different scintillators acquire two signals of different energy components by one radiation irradiation, thereby obtaining the energy subtraction image.

CITATION LIST

Patent Literature

PTL 1: Japanese Patent Laid-Open No. 2010-56396

In PTL 1, since the two photodiodes are used to generate one pixel data of the radiation images, the element structure becomes complex, and the manufacturing cost may increase. Although the two scintillators are arranged, each photodiode can detect the light beam from only one scintillator. For this reason, as in the second embodiment of PTL 1, if the photodiodes are arranged in a planar manner, the detection quantum efficiency (DQE) may degrade, and the S/N ratio of the resultant image may reduce.

The present invention has as its object to provide a technique advantageous in allowing the acquisition of an energy subtraction image and suppressing the degradation of the image quality.

SUMMARY OF THE INVENTION

According to some embodiments, a radiation imaging apparatus including a substrate in which a plurality of conversion elements are arranged in a two-dimensional array and which transmits light beams, a first scintillator arranged on a first surface side of the substrate, and a second scintillator arranged on a second surface side opposite to the first surface of the substrate, wherein the plurality of conversion elements include a plurality of first conversion elements and a plurality of second conversion elements, the plurality of first conversion elements are arranged so as to receive light beams from the first scintillator and the second scintillator, and a light-shielding layer is arranged between the first scintillator and each of the plurality of second conversion elements so as to set light amounts of the plurality of second conversion elements from the first scintillator smaller than those of the first conversion elements from the first scintillator, and the plurality of second conversion elements are arranged to receive a light beam from the second scintillator, is provided.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 is a timing chart showing the operation of the radiation imaging apparatus shown in FIG. 1;

DESCRIPTION OF THE EMBODIMENTS

Specific embodiments of a radiation imaging apparatus according to the present invention will be described below with reference to the accompanying drawings. Note that radiation according to the present invention can include not only α-rays, β-rays, and γ-rays that are beams generated by particles (including photons) emitted by radioactive decay but also beams having energy equal to or more than the energy of these beams, for example, X-rays, particle rays, and cosmic rays.

Figure 1:
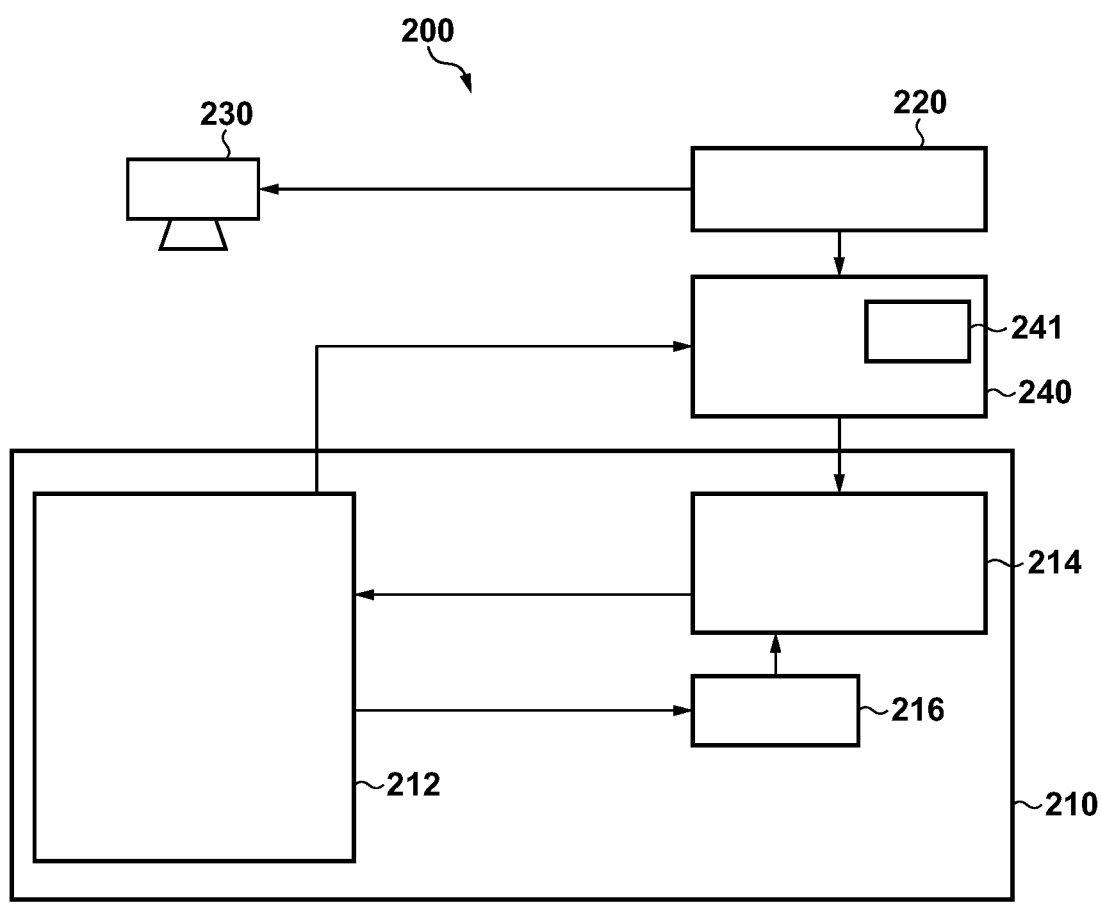
FIG. 1 is a block diagram showing an arrangement example of a radiation imaging system using a radiation imaging apparatus according to an embodiment of the present invention.

The arrangement and operation of a radiation imaging apparatus according to an embodiment of the present invention will be described with reference to FIGS. 1 to 8B. FIG. 1 is a block diagram showing an arrangement example of a radiation imaging system 200 using a radiation imaging apparatus 210 according to the embodiment of the present invention. The radiation imaging system 200 is configured to electrically capture an optimal image converted from radiation and obtain an electrical signal (radiation image data) for generating a radiation image. The radiation imaging system 200, for example, includes the radiation imaging apparatus 210, a radiation source 230, an exposure control unit 220, and a computer 240.

The radiation source 230 starts radiation emission in accordance with an exposure command (emission command) from the exposure control unit 220. The radiation imaging apparatus 210 is irradiated, via a subject (not shown), with the radiation emitted from the radiation source 230. The radiation source 230 stops radiation emission in accordance with a stop command from the exposure control unit 220.

The radiation imaging apparatus 210 includes an imaging panel 212, and a control unit 214 for controlling the imaging panel 212. The control unit 214 generates a stop signal for stopping emission of radiation from the radiation source 230 based on a signal obtained from the imaging panel 212. The stop signal is supplied to the exposure control unit 220, and the exposure control unit 220 sends the stop command to the radiation source 230 in response to the stop signal. The control unit 214 can be configured by a PLD (Programmable Logic Device) such as an FPGA (Field Programmable Gate Array), an ASIC (Application Specific Integrated Circuit), a general-purpose computer in which programs are installed, or a combination of all or some of the above components.

The computer 240 controls the radiation imaging apparatus 210 and the exposure control unit 220. Additionally, the computer 240 includes a signal processing unit 241 for receiving radiation image data output from the radiation imaging apparatus 210 and processing the radiation image data. The signal processing unit 241 can generate the radiation image from the radiation image data.

The exposure control unit 220 includes an exposure switch (not shown) as an example. When the exposure switch is turned on by the user, the exposure control unit 220 sends the exposure command to the radiation source 230 and also sends a start notification indicating the start of the emission of the radiation to the computer 240. Upon reception of the start notification, the computer 240 notifies the control unit 214 of the radiation imaging apparatus 210 of the start of the emission of the radiation in response to the start notification.

Figure 2:
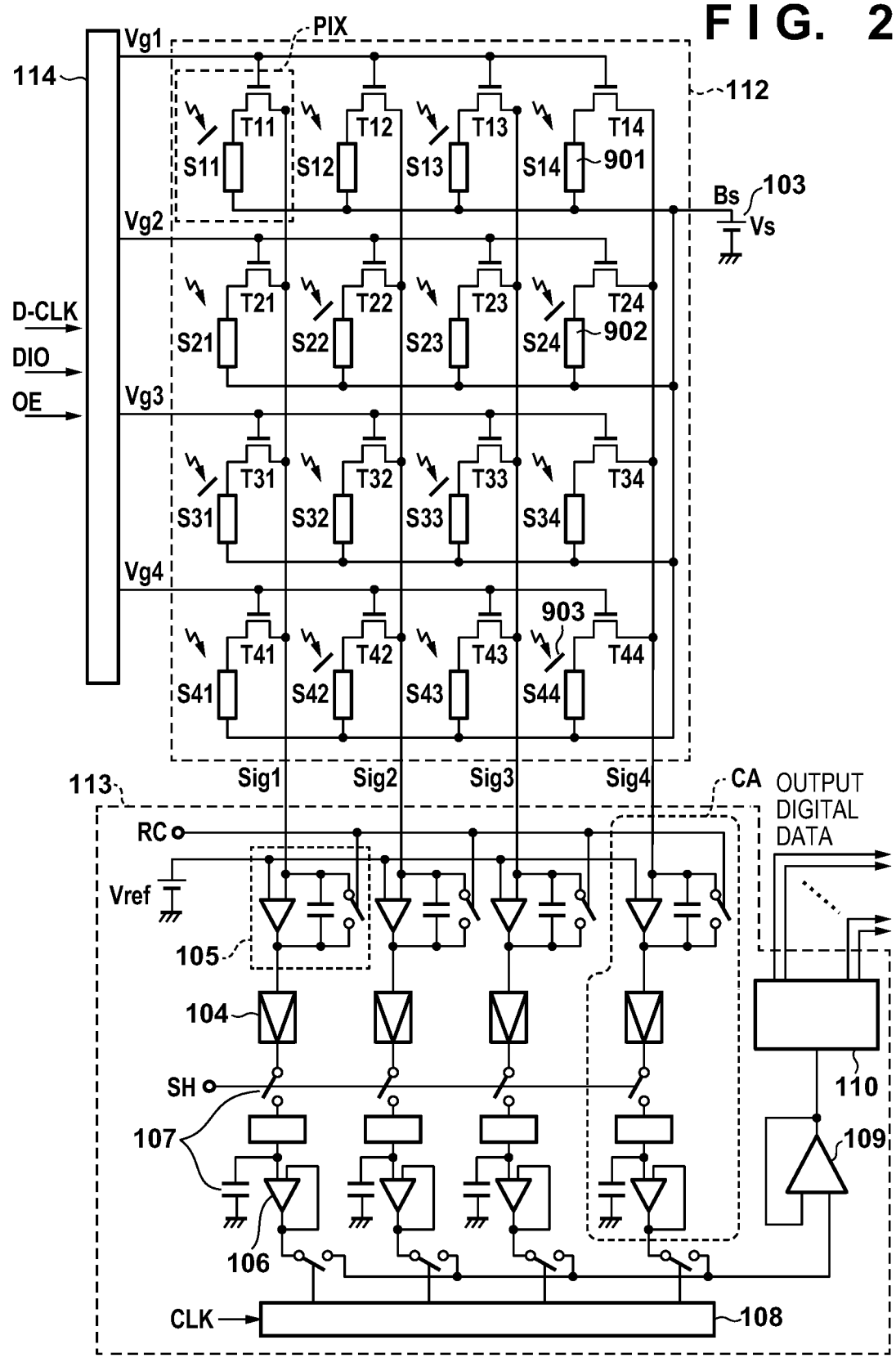
FIG. 2 is a view showing an arrangement example of an imaging panel of the radiation imaging apparatus shown in FIG. 1.

FIG. 2 shows the arrangement example of the imaging panel 212. The imaging panel 212 includes a pixel array 112. The pixel array 112 includes a plurality of pixels PIX respectively including conversion elements S arranged in a two-dimensional array to detect the radiation. The pixel array 112 includes a plurality of signal lines Sig1 to Sig4 along the column direction (vertical direction in FIG. 2) to output signals generated by the conversion elements S. In addition, the imaging panel 212 includes a driving circuit (row selection circuit) 114 for driving the pixel array 112 and a readout circuit 113 for detecting signals appearing on the row signal lines Sig of the pixel array 112. In the arrangement shown in FIG. 2, for the sake of simplicity, the pixel array 112 includes the pixels PIX of 4 rows×4 columns. However, in practice, a larger number of pixels PIX are arrayed. As an example, the imaging panel 212 has a size of 17 inches and can include the pixels PIX of about 3,000 rows×about 3,000 columns.

Each pixel PIX includes the conversion element S for detecting the radiation and a switch T for connecting the conversion element S and the corresponding row signal line Sig (the signal line Sig corresponding to the conversion element C out of the plurality of signal lines Sig). Each conversion element S outputs, to the column signal line Sig, a signal corresponding to the amount of incident radiation. The conversion element S can be a MIS photodiode arranged on an insulating substrate such as a glass substrate and mainly made of amorphous silicon. The conversion element S may be a PIN photodiode. In this embodiment, the conversion element S is configured as an indirect element for detecting the light beam after the radiation is converted into the light beam by the scintillator. In the indirect element, the scintillator is shared by the plurality of pixels PIX (the plurality of conversion elements S).

Each switch T is formed by a transistor such as a thin-film transistor (TFT) including a control terminal (the gate) and two main terminals (the source and drain). Each conversion element S has two main electrodes. One main electrode of the conversion element S is connected to one of the two main terminals of the corresponding switch T, and the other main electrode of the conversion element S is connected to a bias power supply 103 via a common bias line Bs. The bias power supply 103 supplies a bias voltage Vs. The control terminal of the switch T of each pixel PIX arranged on the first row is connected to a gate line Vg1 arranged along the row direction (the lateral direction in FIG. 2). Similarly, the control terminals of the switches SW of the pixels PIX arranged on the second to fourth rows are connected to gate lines Vg2 to Vg4, respectively. Gate signals are supplied from the driving circuit 114 to the gate lines Vg1 to Vg4.

The main terminal of each pixel PIX arranged on the first row, which is not connected to the conversion element S of the switch T is connected to the column signal line Sig1 of the first column. Similarly, the main terminals of the pixels PIX arranged on the second to fourth columns, which are not connected to the conversion elements S of the switches T are connected to the column signal lines Sig2 to Sig4 of the second to fourth columns, respectively.

The readout circuit 113 includes a plurality of column amplification units CA so that one column amplification unit CA corresponds to one column signal line Sig. Each column amplification unit CA can include an integrating amplifier 105, a variable amplifier 104, a sample/hold circuit 107, and a buffer circuit 106. Each integrating amplifier 105 amplifies a signal appearing on the column signal line Sig. Each integrating amplifier 105 includes an operational amplifier, and an integrating capacitor and reset switch connected in parallel between the inverting input terminal and output terminal of the operational amplifier. The noninverting input terminal of the operational amplifier receives a reference potential Vref. By turning on the reset switch, the integrating capacitor is reset, and the potential of the column signal line Sig is reset to the reference potential Vref. Each reset switch can be controlled by a reset pulse RC supplied from the control unit 214.

Each variable amplifier 104 amplifies the signal from the integrating amplifier 105 with a set gain. Each sample/hold circuit 107 samples and holds a signal output from the corresponding variable amplifier 104. Each sample/hold circuit 107 can be formed by a sampling switch and a sampling capacitor. Each buffer circuit 106 buffers (impedance conversion) the signal output from the corresponding sample/hold circuit 107 and outputs the buffered signal. Each sampling switch can be controlled by a sampling pulse supplied from the control unit 214.

The readout circuit 113 includes a multiplexer 108 for selecting, in a predetermined order, signals from the plurality of column amplification units CA arranged so as to correspond to the column signal lines Sig and outputs the selected signals. For example, the multiplexer 108 includes a shift register. The shift register performs a shift operation in accordance with a clock signal CLK supplied from the control unit 214 and selects one of the signals from the plurality of column amplification units CA. The readout circuit 113 further includes a buffer 109 for buffering (impedance conversion) the signal output from the multiplexer 108 and an AD converter 110 for converting an analog signal as a signal output from the buffer 109 into a digital signal. The output, that is, the radiation image data from the AD converter 110 is transferred to the computer 240.

In this embodiment, as will be described later, scintillators for converting the radiation into visible light are formed on the incident surface of the substrate which receives radiation from the substrate and the lower surface opposite to the incident surface so as to cover these two surfaces. In addition, the conversion elements S included in the pixels PIX include two kinds of conversion elements S. In the arrangement shown in FIG. 2, conversion elements (photoelectric conversion elements) S12, S14, S21, S23, S32, S34, S41, and S43 are arranged to receive light beams from the two scintillators. In the following description, if the conversion elements which receive the light beams from the two scintillators out of the conversion elements S are to be specified, these elements are called first conversion elements 901. In addition, light-shielding layers 903 are respectively arranged between one scintillator and conversion elements (photoelectric conversion elements) S11, S13, S22, S24, S31, S33, S42, and S44 to block the light beam from one scintillator, and these elements receive the light bam from the other scintillator. In the following description, if these conversion elements from which the light beam from one scintillator is blocked out of the conversion elements S are to be specified, these elements are called second conversion elements 902. Each light-shielding layer 903 is a layer which blocks the light beam from the scintillator and blocks the light beam between one of the scintillators covering the incident surface and the opposite surface of the substrate and the corresponding second conversion element 902. At this time, in each second conversion element 902, the light beam from one scintillator need not be perfectly blocked. Each light-shield layer 903 can be arranged between one of the scintillators covering the incident surface and the opposite surface of the substrate and the corresponding second conversion element 902 so as to set the amount of the light beam received from one scintillator by the second conversion element 902 smaller than that received by the corresponding first conversion element 901.

Assume that the light-shielding layer 903 is arranged between the scintillator arranged on the incident surface side of the substrate and each second conversion element 902. A low-energy component of the radiation entering from the incident surface side of the substrate is absorbed by the scintillator covering the incident surface side of the substrate and converted into visible light. The visible light enters each pixel PIX. Since the light is blocked on the incident surface side of the substrate, the light beam emitted on the incident surface side of the substrate does not enter the second conversion element 902. For this reason, the light beam converted from the low-energy component does not enter the second conversion element 902. On the other hand, since no light-shielding layer 903 is arranged on the first conversion element 901, the light beam converted from the low-energy component of the radiation enters the first conversion element 901.

The high-energy component of the radiation, which is not absorbed by the scintillator arranged on the incident surface side, is absorbed by the scintillator covering the lower surface side of the substrate and converted into visible light. In the first conversion element 901 and the second conversion element 902, the light beam from the lower surface side of the substrate is not blocked. For this reason, the light beam converted from the high-energy component of the radiation enters both the first conversion element 901 and the second conversion element 902.

As described above, the first conversion element 901 can acquire a signal derived from the high- and low-energy components of the radiation, and the second conversion element 902 can acquire a signal derived from the high-energy component of the radiation. That is, pieces of information indicating different radiation energies can be held by the adjacent pixels PIX. By holding the pieces of information acquired from the radiations having different energy components in the adjacent pixels PIX, energy subtraction can be performed using a method to be described later.

Figure 3A:
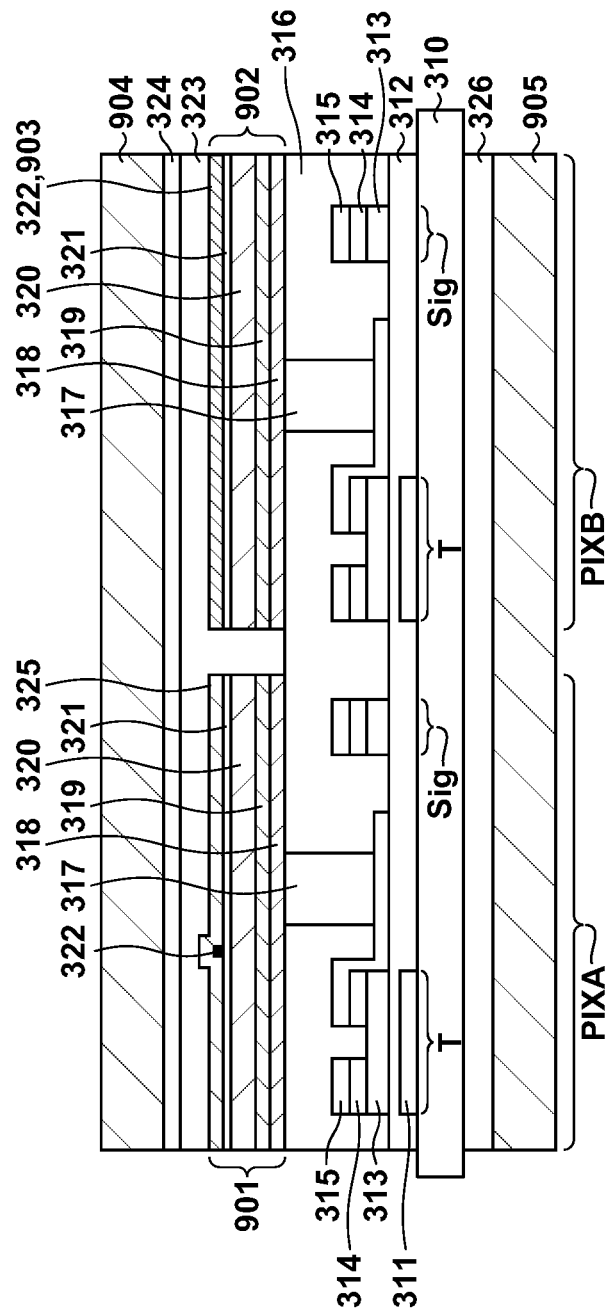
FIG. 3A is a sectional view showing an example of the structure of pixels of the radiation imaging apparatus shown in FIG. 1.
Figure 3B:
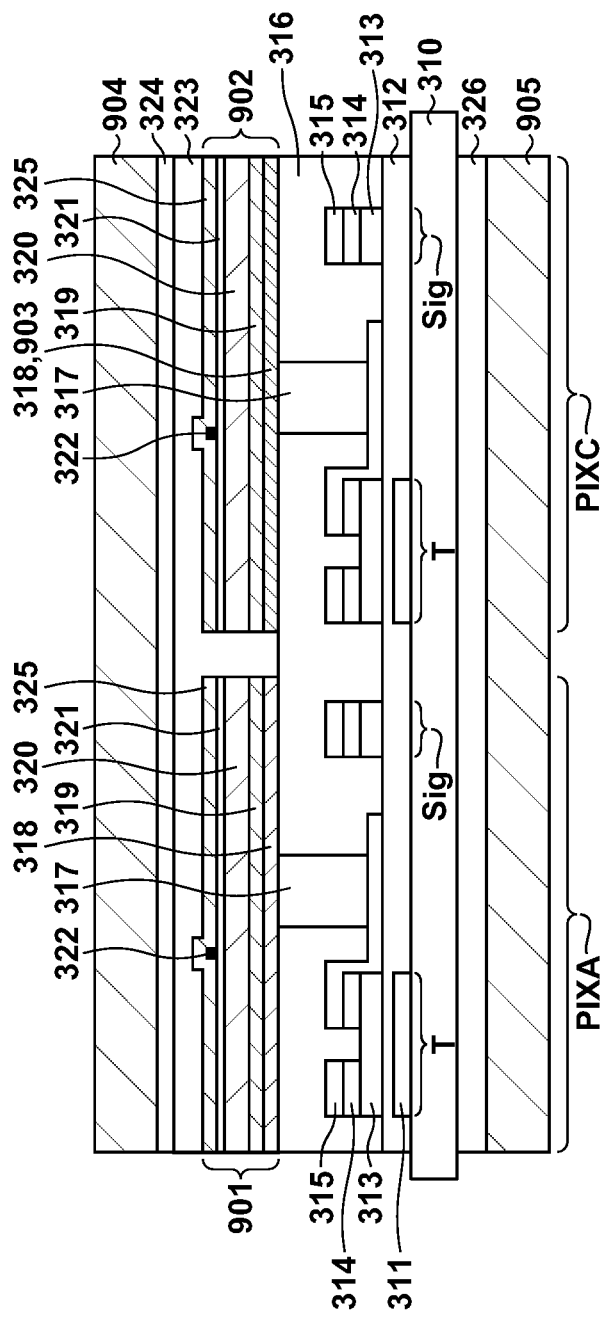
FIG. 3B is a sectional view showing an example of the structure of pixels of the radiation imaging apparatus shown in FIG. 1.
Figure 3C:
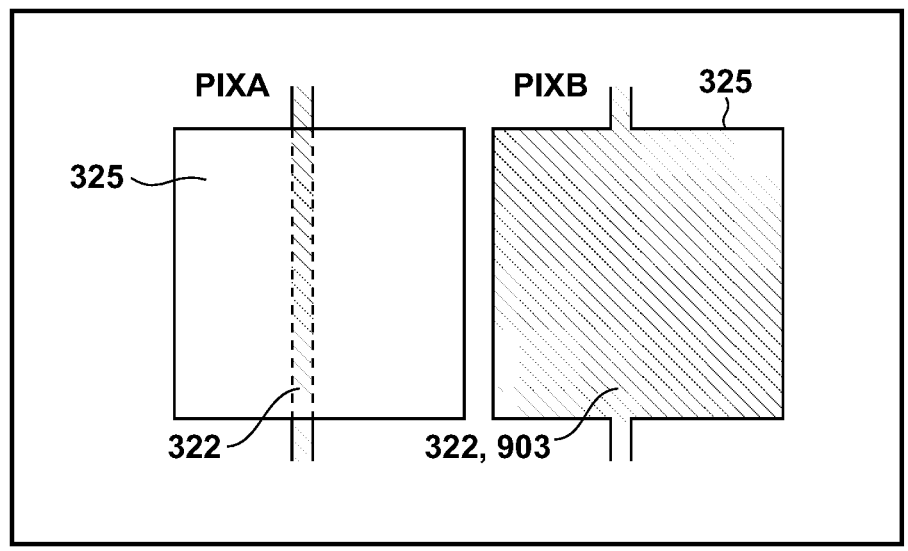
FIG. 3C is a view showing an example of the structure of pixels of the radiation imaging apparatus shown in FIG. 1.

FIGS. 3A to 3D schematically illustrate an example of the structure of a pixel PIXA having the first conversion element 901 and pixels PIXB and PIXC having the second conversion elements 902. A description will be made assuming that the radiation enters downward from the upper side of the drawings, but the radiation may enter upward from the lower side of the drawings. Referring to FIG. 3A, the first conversion element 901 and the second conversion element 902 are arranged between a substrate 310 and a scintillator 904 arranged on the incident surface (the first surface) side of the substrate 310. In addition, in FIG. 3A, in the pixel PIXB, the light-shielding layer 903 is arranged between the second conversion element 902 and the scintillator 904. FIG. 3B is the same as FIG. 3A in that the first conversion element 901 and the second conversion element 902 are arranged between the substrate 310 and the scintillator 904 covering the incident surface side of the substrate 310. However, in the arrangement shown in FIG. 3B, the pixel PIXC is illustrated such that the light-shielding layer 903 is arranged between the second conversion element 902 and a scintillator 905 arranged on the lower surface (the second surface) side opposite to the incident surface of the substrate 310.

The conversion elements S of the pixels PIX are arranged on the insulating substrate 310 such as a glass substrate which transmits light beams generated by the scintillators 904 and 905. Each pixel PIX includes a conductive layer 311, an insulating layer 312, a semiconductor layer 313, an impurity semiconductor layer 314, and conductive layer 315 on the substrate 310 in this order. Each conductive layer 311 forms the gate electrode of a transistor (for example, a TFT) forming the switch T. Each insulating layer 312 is arranged to cover the corresponding conductive layer 311. Each semiconductor layer 313 is arranged on a portion forming the gate electrode of the corresponding conductive layer 311 via the corresponding insulating layer 312. Each impurity semiconductor layer 314 is arranged on the corresponding semiconductor layer 313 so as to form the two main terminals (the source and drain) of the transistor forming the corresponding the switch T. Each conductive layer 315 forms a wiring pattern electrically connected to the two main terminals (the source and drain) of the transistor forming the corresponding switch T. One part of the conductive layer 315 forms the column signal line Sig, and the other part forms the wiring pattern for connecting the corresponding conversion element S and switch T.

Each pixel PIX further includes an interlayer insulating film 316 which covers the corresponding insulating layer 312 and conductive layer 315. Each interlayer insulating film 316 includes a contact plug 317 which connects to a portion forming the switch T out of the conductive layer 315. Each pixel PIX includes the conversion element S arranged on the interlayer insulating film 316. In the example shown in FIGS. 3A and 3B, each conversion element S is configured as an indirect conversion element for converting, into an electrical signal, the light beam converted from the radiation by each of the scintillators 904 and 905. Each conversion element S includes a conductive layer 318, an insulating layer 319, a semiconductor layer 320, an impurity semiconductor layer 321, a conductive layer 322, and an electrode layer 325 stacked on the interlayer insulating film 316. A protective layer 323 and an adhesive layer 324 are arranged on each conversion element S. The scintillator 904 is arranged on the adhesive layer 324 so as to cover the incident surface side of the substrate 310. The scintillator 905 is arranged to cover the lower surface side opposite to the incident surface side of the substrate 310.

The conductive layer 318 forms the lower electrode (the first electrode) of each conversion element S. The conductive layer 322 and the electrode layer 325 form the upper electrode (the second electrode) of each conversion element S. The conductive layer 318, the insulating layer 319, the semiconductor layer 320, the impurity semiconductor layer 321, and the conductive layer 322 form a MIS sensor as the conversion element S. For example, the impurity semiconductor layer 321 is formed by an n-type impurity semiconductor layer. The upper electrode and the lower electrode face each other so as to interpose the semiconductor layer 320 therebetween.

The scintillators 904 and 905 are made of a material such as GOS (gadolinium oxysulfide) or CsI (cesium iodide). Such a material is formed by bonding, printing, or deposition. The scintillators 904 and 905 can be made of the same material or different materials depending on the acquired radiation energies.

In this embodiment, the MIS sensor is exemplified as the conversion element S. However, the present invention is not limited to this. The conversion element S may be, for example, a pn or pin photodiode.

The layout of the light-shielding layer 903 arranged in the second conversion element 902 and used to block the light beam entering from the scintillator 904 or the scintillator 905 will then be described below. In the arrangement shown in FIG. 3A, the second conversion element 902 of the pixel PIXB includes the conductive layer 318 forming the lower electrode, the semiconductor layer 320, and the conductive layer 322 forming the upper electrode from the incident surface side of the substrate 310 to the scintillator 904 in this order. The conductive layer 322 forming the upper electrode functions as the light-shielding layer 903. More specifically, the conductive layer 322 is made of a metal material (for example, Al, Mo, Cr, or Cu) opaque for the light beam emitted from the scintillator 904 and arranged between the scintillator 904 and the semiconductor layer 320, thereby allowing the conductive layer 322 to serve as the light-shielding layer 903. That is, in the second conversion element 902 of the pixel PIXB, the light-shielding layer 903 is arranged between the scintillator 904 and the second conversion element 902 so that the amount of the light beam received from the scintillator 904 is set smaller than that of the first conversion element 901. Similarly, the second conversion element 902 of the pixel PIXB is arranged to receive the light beam from the scintillator 905 as in the first conversion element 901 of the pixel PIXA. On the other hand, in the first conversion element 901 of the pixel PIXA, a material (for example, ITO (indium tin oxide)) transparent to the light beam emitted from the scintillator 904 is used for the conductive layer 318 and the electrode layer 325. The conductive layer 322 is configured to have a smaller area than those of the light-shielding layer 903 and the semiconductor layer 320 in a planar view with respect to the substrate 310. In the example of FIG. 3A, the conductive layer 322 is electrically connected to the electrode layer 325 so that the conductive layer 322 functions as the bias line Bs shown in FIG. 2. In the example shown in FIG. 3C, the conductive layer 322 of the pixel PIXA is configured to have a smaller area than that of the semiconductor layer 320 in a planar view with respect to the substrate 310. On the other hand, the conductive layer 322 of the pixel PIXB is configured to have an area almost equal to that of the semiconductor layer 320 in the planar view with respect to the substrate 310 but an area larger than that of the conductive layer 322 of the pixel PIXA. Therefore, signals having different energy components can be acquired between the adjacent pixels PIXA and PIXB.

In the arrangement shown in FIG. 3B, the second conversion element 902 of the pixel PIXC includes the conductive layer 318 forming the lower electrode, the semiconductor layer 320, the conductive layer 322 forming the upper electrode, and the electrode layer 325 from the incident surface side of the substrate 310 to the scintillator 904 in this order. The conductive layer 318 forming the lower electrode functions as the light-shielding layer 903. More specifically, the conductive layer 318 is made of a metal material (for example, Al, Mo, Cr, or Cu) opaque for the light beam emitted from the scintillator 905 and arranged between the scintillator 905 and the semiconductor layer 320, thereby allowing the conductive layer 322 to serve as the light-shielding layer 903. That is, in the second conversion element 902 of the pixel PIXC, the light-shielding layer 903 is arranged between the scintillator 905 and the second conversion element 902 so that the amount of the light beam received from the scintillator 905 is set smaller than that of the first conversion element 901. Similarly, the second conversion element 902 of the pixel PIXC is arranged to receive the light beam from the scintillator 904 as in the first conversion element 901 of the pixel PIXA. On the other hand, in the first conversion element 901 of the pixel PIXA, a material (for example, ITO (indium tin oxide)) transparent to the light beam emitted from the scintillator 904 is used for the conductive layer 318 and the electrode layer 325. Therefore, signals having different energy components can be acquired between the adjacent pixels PIXA and PIXC.

Figure 3D:
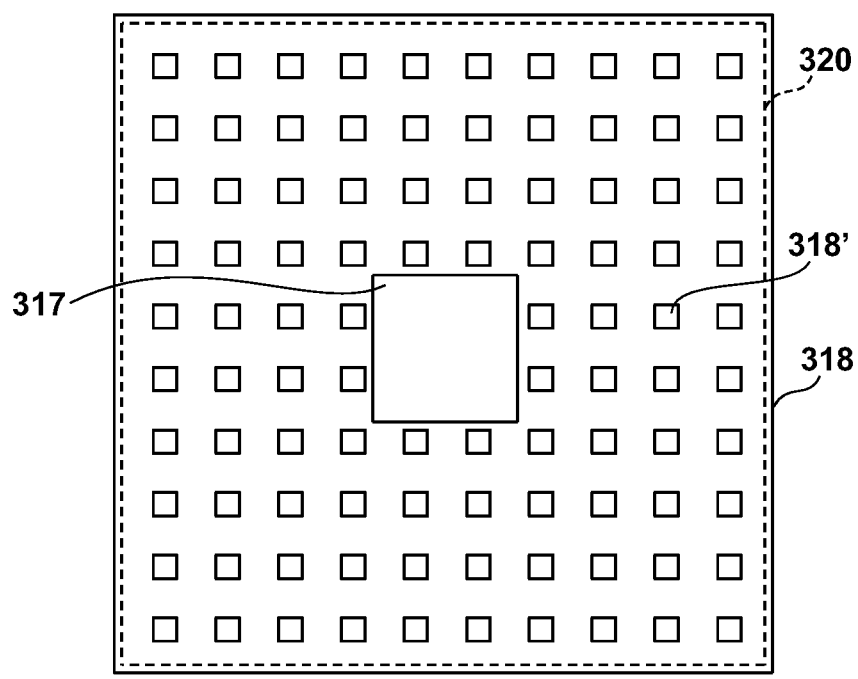
FIG. 3D is a view showing an example of the structure of pixels of the radiation imaging apparatus shown in FIG. 1.

In addition, in the example of FIG. 3D, the conductive layer 318 is made of a metal material (for example, Al, Mo, Cr, or Cu) opaque to the light beam emitted from the scintillator 905. The conductive layer 318 of the pixel PIXA has openings 318'. The conductive layer 318 is configured to have a smaller area than that of the semiconductor layer 320 in a planar view with respect to the substrate 310. The conductive layer 318 of the pixel PIXA is configured to have a smaller area than those of the light-shielding layer 903 and the semiconductor layer 320 in the planar view with respect to the substrate 310. Note that in the examples of FIGS. 3B and 3D, the conductive layer 318 is arranged to be electrically connected to the contact plug 317 so that the conductive layer 318 functions as the lower electrode. Therefore, signals having different energy components can be acquired between the adjacent pixels PIXA and PIXC.

In this embodiment, each of the conductive layer 322 of the pixel PIXB and the conductive layer 318 of the pixel PIXC is exemplified to have the structure of a single layer. However, the present invention is not limited to this. For example, in each of the conductive layer 322 of the pixel PIXB and the conductive layer 318 of the pixel PIXC, a transparent material and an opaque material may be stacked. In this case, the area of the opaque material determines the light-shielding amount. In addition, in this embodiment, each of the conductive layer 322 of the pixel PIXB and the conductive layer 318 of the pixel PIXC functions as the light-shielding layer 903. However, the arrangement of the light-shielding layer 903 is not limited to this. For example, in the pixel PIXB, a dedicated light-shielding layer 903 made of Al, Mo, Cr, or Cu for the light beam entering from the scintillator 904 may be arranged in the protective layer 323. In this case, the potential of the light-shielding layer 903 may be used to be fixed to a predetermined potential.

Like the pixel PIXC shown in FIG. 3B, if the light beam from the scintillator 905 is blocked, the position of the switch T of the pixel PIXA which receives the light beam from the scintillator 905 and the position of the column signal line Sig may be shifted toward the pixel PIXC. With this layout, in the pixel PIXA, the degree of opening of the first conversion element 901 with respect to the scintillator 905 can be increased.

In addition, the light-shielding layer 903 need not perfectly block the light beam from the scintillator 904 or the scintillator 905 to the second conversion element 902, as described above. If the amount of light beam received from the scintillator 904 or the scintillator 905 on the side where the light-shielding layer 903 is arranged is different between the adjacent pixels PIXA and PIXB or between the adjacent pixels PIXA and PIXC, energy subtraction is possible. In this case, the ratio of the light beam entering the second conversion element 902 of the pixel PIXB or PIXC to the light beam entering the first conversion element 901 of the pixel PIXA is measured in advance. Based on this, subtraction processing is performed with reference to the output from the first conversion element 901, thereby performing the correction.

Figure 4A:
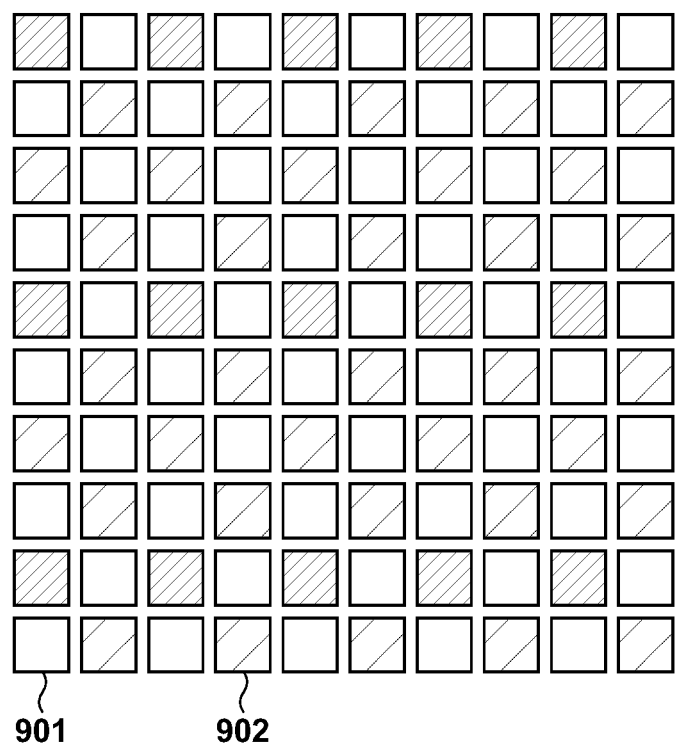
FIG. 4A is a view showing arrangement example of pixels of the radiation imaging apparatus shown in FIG. 1.
Figure 4B:
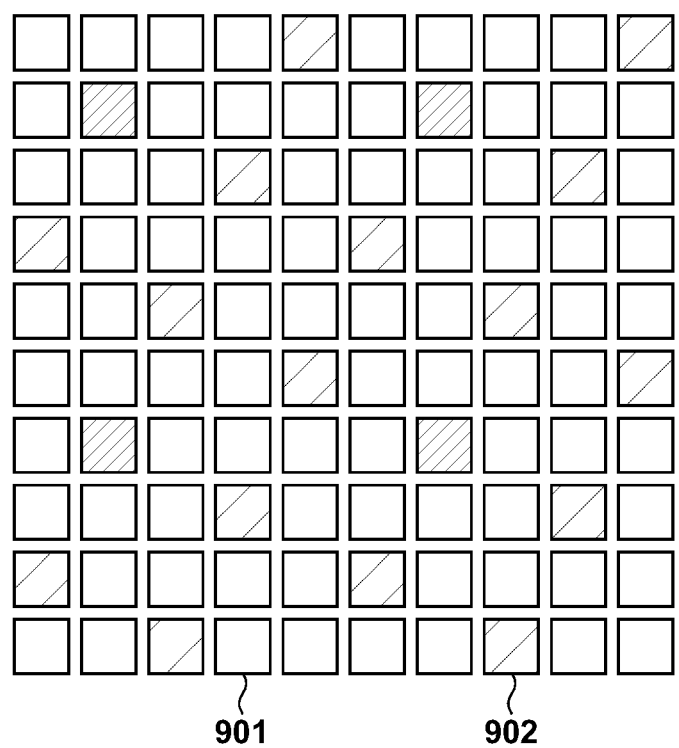
FIG. 4B is a view showing arrangement example of pixels of the radiation imaging apparatus shown in FIG. 1.

As shown in FIGS. 3A and 3B, in the orthographic projection with respect to the incident surface of the substrate 310, the column signal lines Sig overlap parts of the pixels PIX, respectively. With this arrangement, it is advantageous in increasing the area of the conversion elements S of the pixels PIX. However, it is disadvantageous because the capacitive coupling between the column signal line Sig and the conversion element S is large. If the radiation enters the conversion elements and the charges are accumulated in the conversion element S to change the potential of the corresponding conductive layer 318 serving as the lower electrode, the capacitive coupling between the column signal line Sig and the conversion element S changes the potential of the column signal line Sig, thereby generating a crosstalk. FIGS. 4A and 4B shows a method of coping with this crosstalk. In the conversion elements S aligned in the row direction crossing the column direction out of the plurality of conversion elements S, the number of pixels PIX having the second conversion elements 902 in which the included light-shielding layers 903 are arranged is set to be equal in the rows. Similarly, in the conversion elements S aligned in the column direction out of the plurality of conversion elements S, the number of pixels PIX having the included second conversion elements 902 is set equal in the columns. With this arrangement, generation of artifacts caused by the crosstalks for each row and each column can be suppressed.

In addition, the radiation imaging apparatus 210 may have a function of automatically detecting the start of radiation irradiation. In this case, for example, the switch T is operated to turn on/off the gate line Vg, the signal is read out from the corresponding conversion element S, and the presence/absence of the radiation irradiation is determined from the output signal. If the number of pixels PIX having the second conversion elements 902 having the light-shielding layers 903 changes for each row, the signal amount output for each row changes, so that the detection precision varies. For this reason, as shown in FIGS. 4A and 4B, in the conversion elements S aligned in the row direction crossing the column direction out of the plurality of conversion elements S, the numbers of pixels PIX having the second conversion elements 902 including the light-shielding layers 903 are set equal to each other for the respective rows. With this arrangement, the detection precision for automatically detecting the start of radiation irradiation can be stabilized.

In addition, in the arrangement example of the pixels PIX in FIG. 4B, the density of the pixels PIX having the second conversion elements 902 is lower than that of the arrangement example of the pixels PIX in FIG. 4A. Since the light beam from the scintillator 905 enters each conversion element S via the substrate 310, the light beam is diffused due to the thickness of the substrate 310, and the MTF (Modulation Transfer Function) is reduced. Accordingly, even if the density of the pixels PIX having the second conversion elements 902 is reduced, the decrease in the resolving power does not substantially occur. That is, if each second conversion element 902 receives the light beam emitted from the opposing scintillator 905 of the two scintillators via the substrate 310, the number of pixels PIX having the first conversion elements 901 can be smaller than the number of pixels PIX having the second conversion elements 902.

In order to suppress diffusion and reduce the decrease in MTF of the light beam from the scintillator 905 via the substrate 310, the thickness of the substrate 310 may be reduced by mechanical polishing or chemical polishing. In addition, in order to reduce the decrease in MTF, a scattering preventive layer 326 such as a louver layer or a microlens for giving directivity to the light beam emitted from the scintillator may be arranged between the scintillator 905 and the substrate 310, as shown in FIGS. 3A and 3B. Alternatively, in order to reduce the decrease in MTF, the resolving power may be increased by sharpening processing in the image processing in the signal processing unit 241 of the computer 240. Further, as a method of matching the MTF of the low-energy component by the light beam from the scintillator 904 and the MTF of the high-energy component by the light beam from the scintillator 905, the MTF may be reduced to match the high-energy component with the low-energy component. After that, the energy subtraction processing may be performed.

Figure 5:
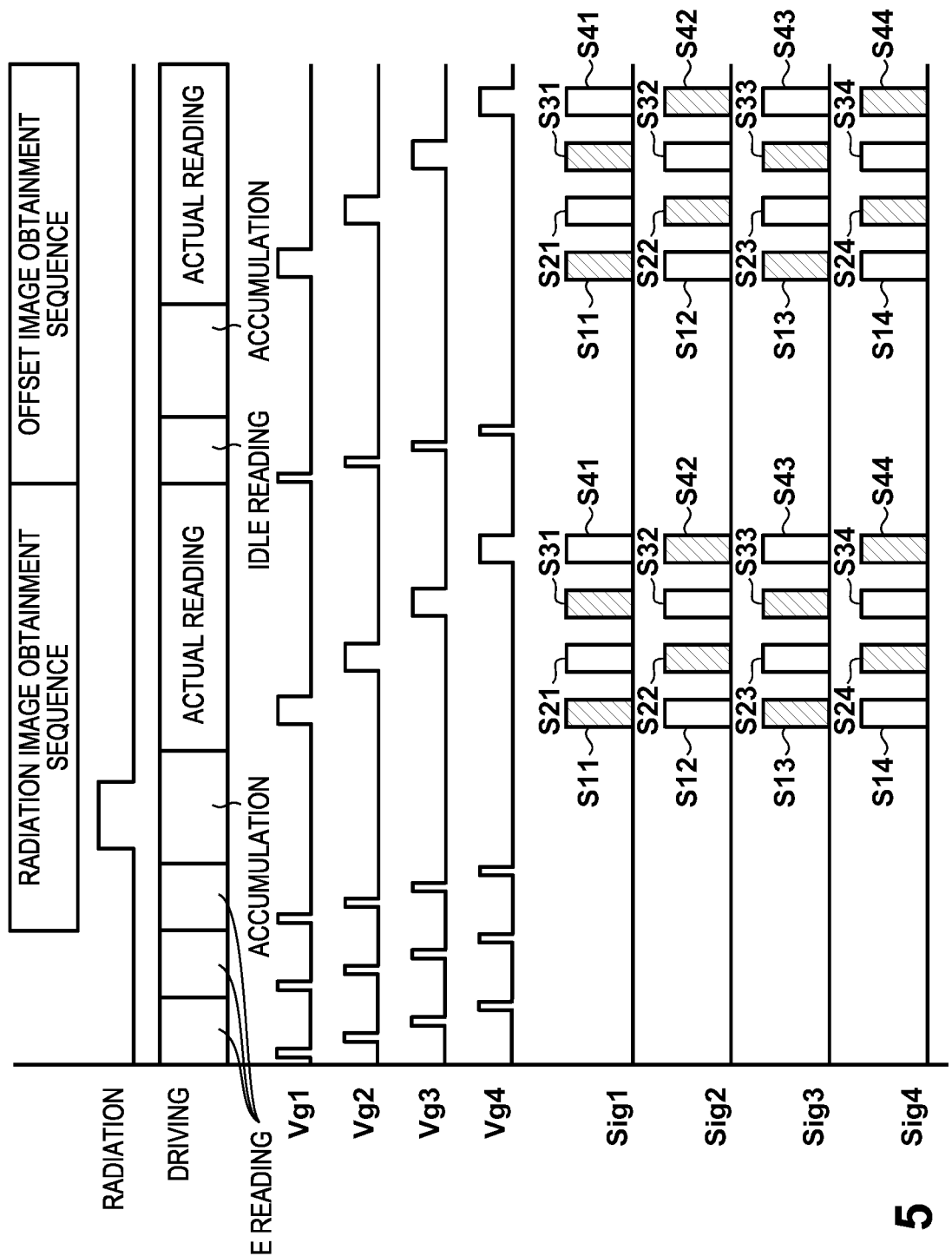
FIG. 5 is a timing chart showing the operation of the radiation imaging apparatus shown in FIG. 1.

The operations of the radiation imaging apparatus 210 and the radiation imaging system 200 will be described next with reference to FIG. 5. In this case, an example of the operation of the radiation imaging apparatus 210 including the imaging panel 212 having the pixels PIX of the 4 rows and 4 columns each having the conversion element S, as shown in FIG. 2, will be described below. The operation of the radiation imaging system 200 is controlled by the computer 240. The operation of the radiation imaging apparatus 210 is controlled by the control unit 214 under the control of the computer 240.

First, until the start of radiation emission from the radiation source 230, in other words, until the start of radiation irradiation to the radiation imaging apparatus 210, the control unit 214 causes the driving circuit 114 and the readout circuit 113 to perform idle reading. The idle reading is performed by causing the driving circuit 114 to sequentially drive the gate signals supplied to the gate lines Vg1 to Vg4 of the respective rows of the pixel array 112 to the active level and reset the dark charges accumulated in the conversion elements S. In the idle reading, a reset pulse of the active level is supplied to the reset switch of the integrating amplifier 105, so that each column signal line Sig is reset to the reference potential. The dark charges are charges generated even if the radiation does not enter the conversion element S.

The control unit 214 can detect the start of the radiation emission from the radiation source 230 based on, for example, a start notification supplied from the exposure control unit 220 via the computer 240. In addition, as shown in FIG. 1, a detection circuit 216 for detecting a current flowing through the bias line Bs or the column signal line Sig of the pixel array 112 may be arranged in the radiation imaging apparatus 210. The control unit 214 can detect the start of radiation irradiation from the radiation source 230 based on the output from the detection circuit 216.

When the radiation irradiation is performed, the control unit 214 controls each switch T in an open state (an off state). This makes it possible to accumulate the charges generated in each conversion element S by the radiation irradiation. The control unit 214 waits for this state until the end of radiation irradiation.

Next, the control unit 214 causes the driving circuit 114 and the readout circuit 113 to perform actual reading. In the actual reading, the driving circuit 114 drives the gate signals supplied to the gate lines Vg1 to Vg4 of the respective rows of the pixel array 112 to the active level. The readout circuit 113 reads out the charges accumulated in each conversion element S via the corresponding column signal line Sig and outputs the charges as the radiation image data to the computer 240 via the multiplexer 108, the buffer 109, and the AD converter 110.

Offset image data acquisition will be described next. The dark charges are kept accumulated in each conversion element S even in a state in which radiation irradiation is not performed. For this reason, the control unit 214 acquires offset image data by performing the same operation as in a case for acquiring radiation image data without radiation irradiation. By subtracting the offset image data from the radiation image data, the offset component by the dark charges can be removed.

Driving for obtaining a moving image will be described next with reference to FIG. 6. To obtain a moving image, the plurality of gate lines Vg are simultaneously driven to the active level so as to read out the charges at high speed. In this case, if a signal from each pixel PIX having the first conversion element 901 and a signal from each pixel PIX having the second conversion element 902 are output to one column signal line Sig, the energy components cannot be separated. For this reason, as shown in FIG. 6, by simultaneously setting the gate signals supplied to the gate lines Vg1 and Vg3 to the active level, the signals from the conversion elements S12 and S32 of the first conversion elements 901 are output to the column signal line Sig2. At the same time, the signals from the conversion elements S11 and S31 of the second conversion elements 902 are output to the column signal line Sig1. Since the signals from the first conversion element 901 and the second conversion element 902 are output to the different column signal lines Sig, the energy subtraction processing can be performed.

Figure 7A:
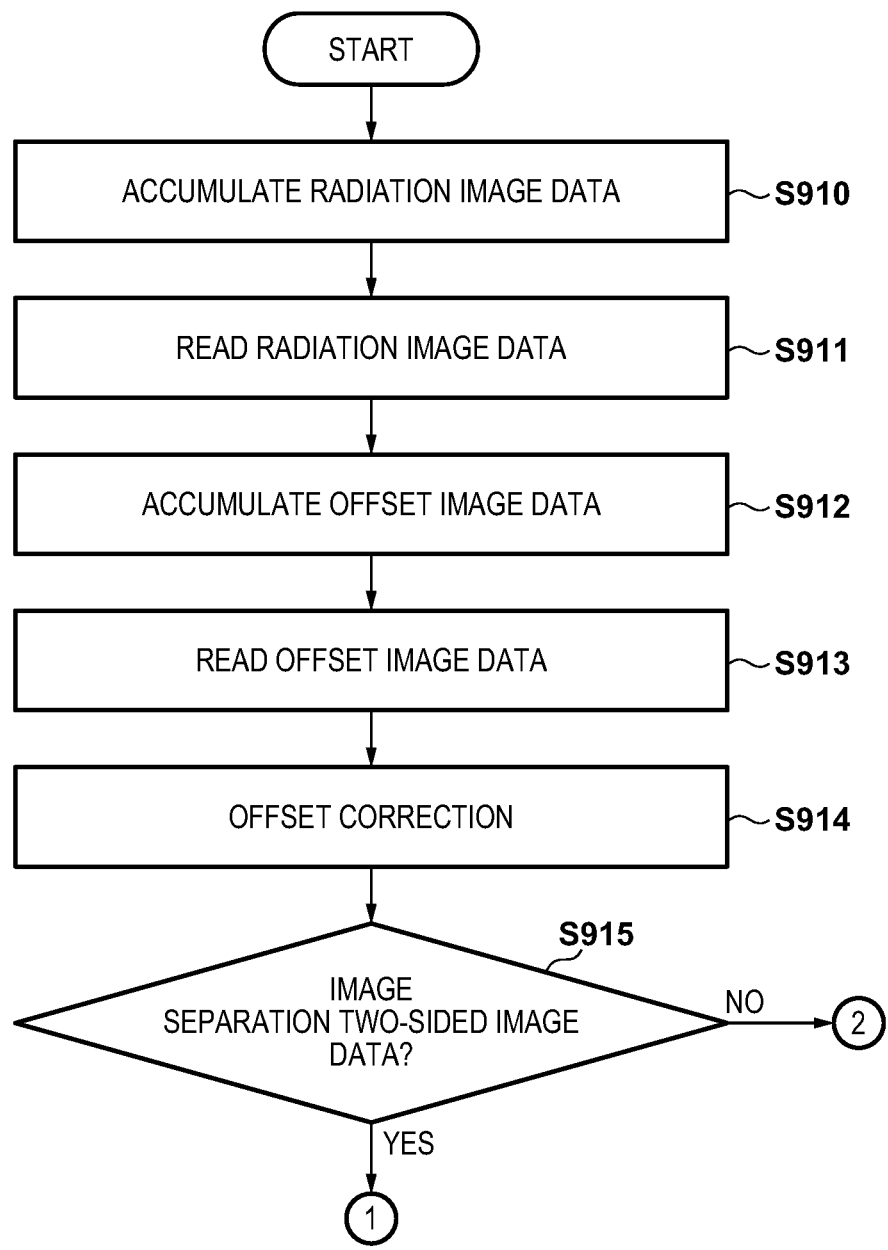
FIG. 7A is a flowchart showing the operation of the radiation imaging apparatus shown in FIG. 1.
Figure 7B:
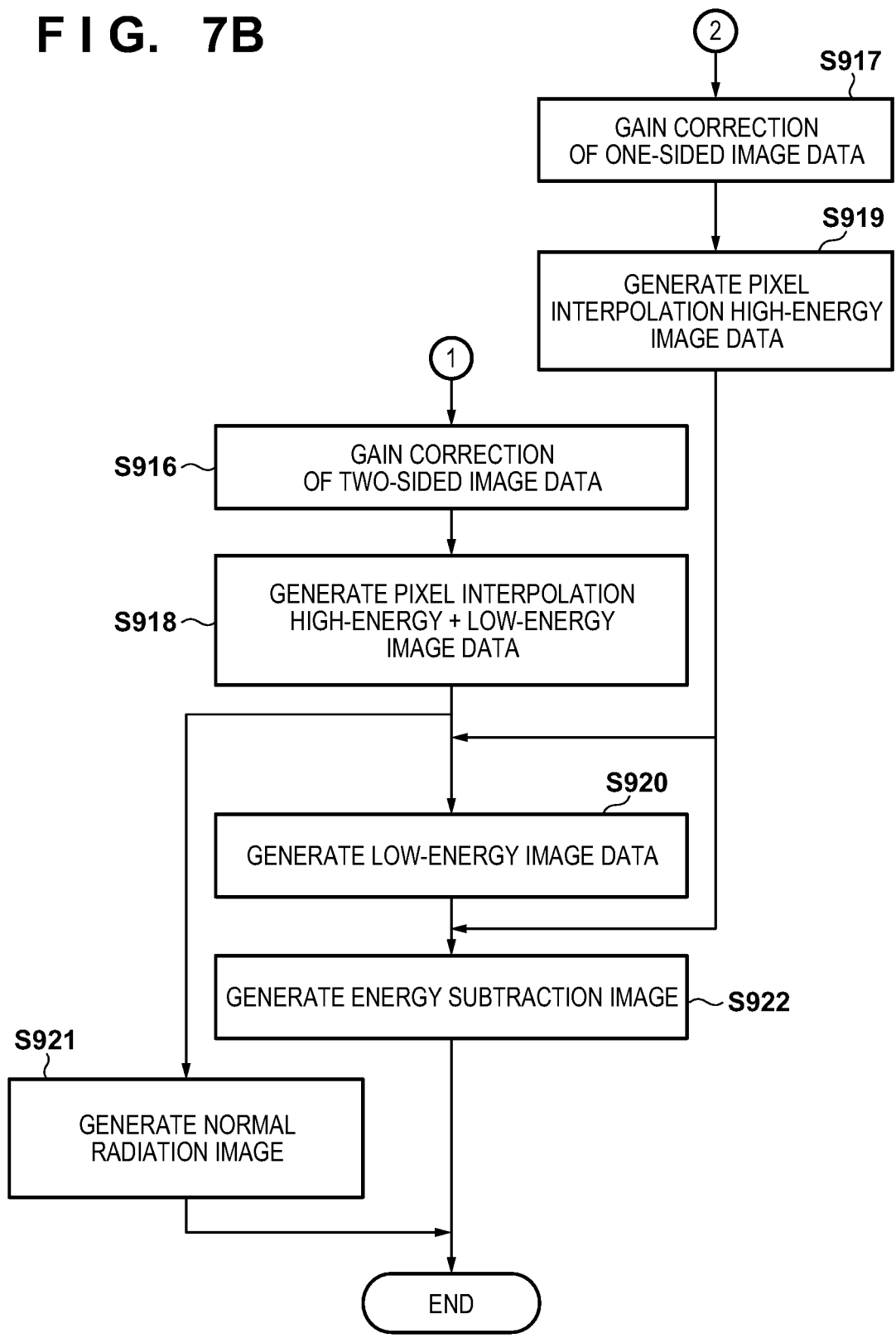
FIG. 7B is a flowchart showing the operation of the radiation imaging apparatus shown in FIG. 1.

The image processing flowcharts according to this embodiment will be described with reference to FIGS. 7A and 7B. First, in step S910, the control unit 214 controls to accumulate the charges generated by each conversion element S during radiation irradiation in order to obtain the radiation image data after the idle reading described above is performed. Next, in step S911, the control unit 214 causes the driving circuit 114 and the readout circuit 113 to perform actual reading to read out the radiation image data. In step S911, the radiation image data is output to the computer 240. Next, in step S912, the control unit 214 performs the accumulation operation to acquire offset image data. In step S913, the control unit 214 causes the driving circuit 114 and the readout circuit 113 to read out the offset image data and output it to the computer 240.

Next, in step S911, the signal processing unit 241 of the computer 240 performs offset correction by subtracting the offset image data acquired in step S913 from the radiation image data acquired in step S911. Next, in step S915, the signal processing unit 241 separates the radiation image data having undergone the offset correction into radiation image data output from the first conversion element 901 and the radiation image data output from the second conversion element 902. In this case, in the arrangement shown in FIG. 3A, a description will be made assuming that the second conversion element 902 receives the light beam from the above, but the light beam from the scintillator 904 is blocked, so that the second conversion element 902 receives the light beam generated by the high-energy radiation from the scintillator 905. In addition, the radiation image data output from the first conversion element 901 is denoted by two-sided image data, and the radiation image data output from the second conversion element 902 is denoted by one-sided image data.

Next, in step S916, the signal processing unit 241 performs gain correction of the two-sided image data using gain correction image data captured in the absence of the object. In addition, the signal processing unit 241 performs gain correction of the two-sided image data using the gain correction image data in step S917.

After the gain correction, in step S918, the signal processing unit 241 performs pixel interpolation for compensating the omission of the two-sided image data of the pixel PIX without including the first conversion element 901, in other words, the pixel PIX including the second conversion element 902. Similarly, in step S919, the signal processing unit 241 performs pixel interpolation for compensating the omission of the one-sided image data of the pixel PIX without including the second conversion element 902, in other words, the pixel PIX including the first conversion element 901. The pixel interpolation operations in steps S918 and S919 will be described with reference to FIGS. 8A and 8B. In this case, an arrangement in which the number of pixels PIX including the first conversion elements 901 shown in FIG. 4B is larger than the number of pixels PIX including the second conversion elements 902 will be described as an example.

Figure 8A:
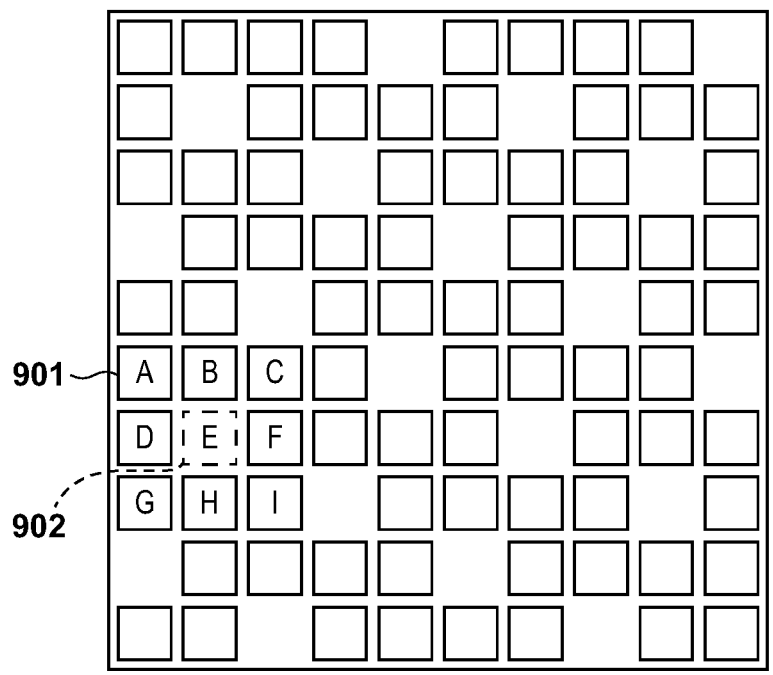
FIG. 8A is a view showing an example of pixel interpolation of the radiation imaging apparatus shown in FIG. 1.

The pixel interpolation of the two-sided image data will be described first with reference to FIG. 8A. The two-sided image data of a pixel E having the second conversion element 902 which outputs the one-sided image data is interpolated using the two-sided image data of pixels A, B, C, D, F, G, H, and I adjacent to the pixel E and having the first conversion elements 901 which output the two-sided image data. For example, the signal processing unit 241 can interpolate the two-sided image data of the pixel E using an average value of the two-sided image data of the eight pixels adjacent to the pixel E. Alternatively, for example, the signal processing unit 241 may interpolate the two-sided image data of the pixel E using an average value of the two-sided image data of some adjacent pixels like the pixels B, D, F, and H. In step S918, by performing the pixel interpolation, radiation image data generated by the high- and low-energy components of the radiations of the respective pixels PIX are generated.

Figure 8B:
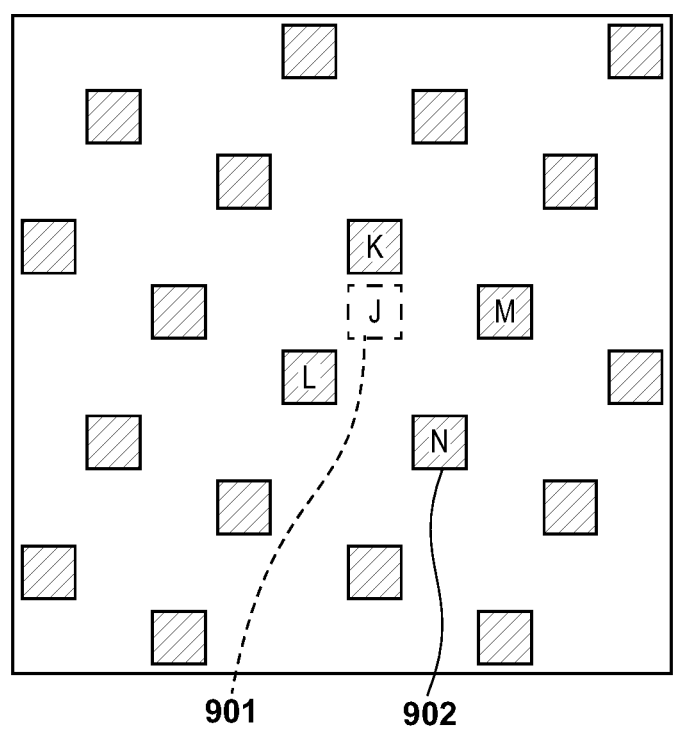
FIG. 8B is a view showing an example of pixel interpolation of the radiation imaging apparatus shown in FIG. 1.

The pixel interpolation of the one-sided image data will be described with reference to FIG. 8B. The one-sided image data of a pixel J having the first conversion element 901 which outputs the two-sided image data is interpolated using the one-sided image data of pixels K, L, M, and N adjacent to the pixel J and having the second conversion elements 902 which output the one-sided image data. For example, the signal processing unit 241 can interpolate the one-sided image data of the pixel J using an average value of the one-sided image data of the four pixels adjacent to the pixel J. In this case, for example, a distance from the position where the pixel J is arranged to the pixel K is different from a distance from the position where the pixel J is arranged to the pixel N. For this reason, the one-sided image data output from the pixels K, L, M, and N may be weighted and averaged in accordance with the distances. In step S919, by performing the pixel interpolation, the radiation image data generated by the high-energy components of the radiations of the pixels PIX are generated.

Next, in step S920, the signal processing unit 241 generates radiation image data by the low-energy component of the radiation. As described above, if the light-shielding layer 903 is arranged on the side where the radiation of the second conversion element 902 enters, the one-sided image data serves as the radiation image data by the high-energy component. In addition, the two-sided image data serves as the radiation image data including both the high-energy component and the low-energy component. Accordingly, the stored one-sided image data can be subtracted from the two-sided image data having undergone pixel interpolation to generate the radiation image data having the low-energy component.

If the light-shielding layer 903 is arranged on a side opposite to the side where the radiation of the second conversion element 902 enters, the one-sided image data serves as the radiation image data by the low-energy component. For this reason, the stored one-sided image data can be subtracted from the two-sided image data having undergone pixel interpolation to generate the radiation image data having the high-energy component. However, since the radiation image by the high-energy component is a radiation component which cannot be absorbed by the scintillator 904 on the side where the radiation enters, the light beam amount from the scintillator 905 is smaller than that from the scintillator 904. For this reason, if the one-sided image data is subtracted from the two-sided image data and the radiation image data of the high-energy component is generated, noise of the radiation image data of the low-energy component is superimposed on the radiation image data of the high-energy component. As a result, the S/N ratio of the radiation image data of the high-energy component is reduced. To cope with this, as shown in the above embodi-ment, the side on which the radiation of the second conversion element 902 enters is blocked. The two-sided image data is set to the image data of the high-energy component+ the low-energy component, and the one-side image data is set to the image data of the one-sided image data. The one-sided image data is subtracted from the two-sided image data to generate the low-energy image, thereby increasing the S/N ratio.

In step S922, the signal processing unit 241 generates an energy subtraction image. More specifically, the signal processing unit 241 obtains differences between signals respectively output from the second conversion elements 902 and differences between the signals respectively output from the first conversion elements 901 and obtained in step S920 and the signals respectively output from the second conversion elements 902. Accordingly, the energy subtraction image as the difference between the radiation image data of the high-energy component and the radiation image data of the low-energy component is generated.

In addition, the signal processing unit 241 may generate a normal radiation image without energy subtraction in step S920 based on the two-sided image data respectively output from the first conversion elements 901 in step S918. Each first conversion element 901 receives the light beam from the scintillator 904 on the incident side of the radiation and the light beam from the scintillator 905 on the side opposite to the radiation incident side. Therefore, a higher S/N ratio can be obtained in the normal radiation image than a case in which only the light beam emitted from one scintillator is received.

In order to generate one pixel data of a radiation image shown in PTL 1, assume a radiation imaging apparatus in which two conversion elements, that is, a conversion element for receiving only the light beam from the scintillator on the radiation incident side and a conversion element for receiving only the light beam from the scintillator on the opposite side are arranged. A difference between the two signals output from these two conversion elements can be obtained to generate an energy subtraction image. In addition, these two signals can be added to obtain a normal radiation image. However, in order to generate one pixel data, the two conversion elements are required so that the structure may be complicated and the manufacturing cost may be increased. In addition, the size of each conversion element is reduced, and the S/N ratio of the resultant signal may be decreased. When two signals are added for generating a normal radiation image, noise components superimposed on these signals may be added, and the S/N ratio may be low. On the other hand, in this embodiment, the light-shielding layers 903 for blocking the light beam from the scintillator 904 or the scintillator 905 may be arranged in only some of the pixels PIX having the second conversion elements 902 out of the plurality of pixels PIX. That is, the light-shielding layers 903 are added to some of the pixels PIX. This makes it possible to implement the radiation imaging apparatus which can avoid complication of the structure, suppress the manufacturing cost, and obtain the energy subtraction image. In addition, each first conversion element 901 receives the light beams emitted from the scintillator 904 and the scintillator 905. The sensitivity for the incident radiation can be improved, and as a result the image quality of the resultant radiation image can be improved. In addition, even if a normal radiation image is to be generated, the radiation image can be generated from the signals generated upon reception of the light beams from the two scintillators 904 and 905. Therefore, as compared to the structure in PTL 1, the S/N ratio obtained upon capturing the normal radiation image can be improved.

In addition, according to this embodiment, radiation images of the radiations having two different energy components can be recorded by one radiation irradiation (a one-shot method) for the object using one imaging panel 212. For this reason, as compared with the radiation imaging apparatus for generating the energy subtraction image using two imaging panels, the number of parts and the manufacturing cost of the radiation imaging apparatus can be reduced. In addition, since the weight of the radiation imaging apparatus 210 can be reduced, a portable radiation imaging apparatus convenient for the user can be implemented. Furthermore, since the energy subtraction image can be generated using one imaging panel, a radiation imaging apparatus in which the positional shifts of the conversion elements between the two imaging panels do not occur can be implemented. In addition, in generation of the normal radiation image other than the energy subtraction image, a radiation imaging apparatus capable of generating a radiation image having a high S/N ratio can be implemented.

The present invention is not limited to the above-described embodiments, and various changes and modifications can be made within the spirit and scope of the present invention. Therefore, to apprise the public of the scope of the present invention, the following claims are made.

The above solution provides a technique advantageous in improving the resolutions and luminance characteristics of the scintillators.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A radiation imaging apparatus, comprising:
   a substrate in which a plurality of conversion elements is arranged in a two-dimensional array and which transmits light beams, the plurality of conversion elements including a first conversion element and a second conversion element;
   a first scintillator arranged on a first surface side of the substrate; and
   a second scintillator arranged on a second surface side of the substrate opposite to the first surface, wherein
   a light-shielding layer is arranged between the first scintillator and a semiconductor layer of the second conversion element so as to set light amounts received by the semiconductor layer of the second conversion element from the first scintillator smaller than those of the first conversion element from the first scintillator, and the semiconductor layer of the second conversion element is arranged to receive a light beam from the second scintillator,
   with the provisos that a light shielding layer is not disposed between a semiconductor layer of the first conversion element and the first scintillator, and a light shielding layer is not disposed between the semiconductor layer of the first conversion element and the second scintillator.

2. The radiation imaging apparatus according to claim 1, wherein the plurality of conversion elements is arranged between the first surface and the first scintillator.

3. The radiation imaging apparatus according to claim 2, wherein each of the plurality of conversion elements includes a first electrode, the semiconductor layer, and a second electrode in this order from the first surface side to the first scintillator, and
   the second electrode is configured to function as the light-shielding layer in the second conversion element.

4. The radiation imaging apparatus according to claim 2, comprising a scattering preventive layer arranged between the second scintillator and the second surface.

5. The radiation imaging apparatus according to claim 1, wherein the plurality of conversion elements is arranged between the second surface and the second scintillator.

6. The radiation imaging apparatus according to claim 5, wherein each of the plurality of conversion elements includes a first electrode, the semiconductor layer, and a second electrode in this order from the second surface side to the second scintillator, and
   the first electrode is configured to function as the light-shielding layer in the second conversion element.

7. The radiation imaging apparatus according to claim 6, wherein the first electrode is a metal material, and
   an area of the first electrode arranged in the first conversion element out of the first electrode is smaller than an area of the first electrode and the semiconductor layer arranged in the second conversion element out of the first electrode in a planar view with respect to the substrate.

8. The radiation imaging apparatus according to claim 1, which is configured for radiation to enter from the first surface side.

9. The radiation imaging apparatus according to claim 1, which is configured for radiation to enter from the second surface side.

10. The radiation imaging apparatus according to claim 1, further comprising:
    a plurality of signal lines along a column direction in which signals generated by the plurality of conversion elements are configured to be output, wherein
    the plurality of conversion elements includes a plurality of the first conversion elements and a plurality of the second conversion elements, and
    among conversion elements aligned in a row direction crossing the column direction out of the plurality of conversion elements, the numbers of the plurality of included second conversion elements are equal to each other for the respective rows.

11. The radiation imaging apparatus according to claim 10, wherein among conversion elements aligned in the column direction out of the plurality of conversion elements, the numbers of the plurality of included second conversion elements are equal to each other for the respective columns.

12. The radiation imaging apparatus according to claim 1, further comprising:
    a plurality of signal lines along a column direction in which signals generated by the plurality of conversion elements are configured to be output, wherein
    among conversion elements aligned in the column direction out of the plurality of conversion elements, the numbers of the plurality of included second conversion elements are equal to each other for the respective columns.

13. The radiation imaging apparatus according to claim 1, wherein the plurality of conversion elements includes a plurality of the first conversion elements and a plurality of the second conversion elements, and
    the number of the plurality of second conversion elements is smaller than the number of the plurality of first conversion elements.

14. A radiation imaging system, comprising:
the radiation imaging apparatus according to claim 1; and
a signal processing unit configured to process a signal from the radiation imaging apparatus.

15. The radiation imaging system according to claim 14, wherein the signal processing unit is configured to generate an energy subtraction image based on signals output from the first conversion element and signals output from the second conversion element.

16. The radiation imaging system according to claim 14, wherein the signal processing unit is configured to generate an energy subtraction image based on differences between signals output from the second conversion element and differences between signals output from the first conversion element and signals output from the second conversion element.

17. The radiation imaging system according to claim 14, wherein the signal processing unit is configured to generate a normal radiation image based on signals output from the first conversion element.

* * * * *